Patented Mar. 29, 1932

1,851,762

UNITED STATES PATENT OFFICE

JOHANNES FAHRENHORST, KARL GOEGGEL, AND FRANZ KRAEGELOH, OF LUDWIGS-HAFEN-ON-THE-RHINE, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

CATALYTIC REACTION

No Drawing. Application filed December 13, 1928, Serial No. 325,911, and in Germany January 5, 1928.

This invention relates to improvements in catalytic reactions, in which hydrogen is employed under pressure.

We have found that catalytic reactions, in which hydrogen is employed under pressure, can, generally speaking, be carried out most advantageously if the catalyst or catalysts employed be first exposed to irradiation by rays of high frequency, in the presence of inert gases, or of gases, vapors or liquids which take part in the catalytic reaction, which the catalyst is intended to effect, the catalyst being during such treatment in the same physical or chemical state, insofar as its visible properties are concerned, in which it is subsequently to display its activity; the said gases, vapors or liquids are hereinafter referred to for the sake of brevity as "protective diluents". Rays suitable for this purpose are, for example, X-rays (Röntgen rays), rays of radioactive substances and the like. The beneficial action of the irradiation shows itself especially by the substantial increase in the activity and length of service of the catalyst as compared with the catalysts hitherto known which have not been subjected during their production to an irradiation by rays of high frequency. Owing to the increase in activity of the catalyst a greatly increased yield of the desired reaction products is obtained.

The method of working herein described may be applied, very advantageously, for example, in the synthesis of ammonia from nitrogen and hydrogen, in the catalytic production of methanol and other organic oxygen compounds from hydrogen and carbon monoxide, and in other catalytic reactions, which are carried out with or without the employment of pressure. In many cases a comparatively short irradiation of the catalyst is sufficient to impart an unexpectedly high efficiency and insensitiveness for a very long period.

The irradiation of the catalyst prior to its use may be effected in the apparatus in which the catalytic reaction is to be performed or in any other convenient apparatus, it being practically immaterial even for such catalysts as are intended for synthesis under pressure whether the catalyst is under ordinary or elevated pressure during the irradiation.

The following example will further illustrate the nature of the said invention which, however, is not limited thereto.

Example

An iron catalyst, prepared in any known and suitable manner, for the synthesis of ammonia, is placed in a contact tube, enclosed in a pressure resisting shell, and is then treated for 24 hours, at from 500° to 600° C and under a pressure of 180 atmospheres, with a mixture of nitrogen and hydrogen for 24 hours. The contact tube, containing the catalyst, is then taken out of the apparatus, the nitrogen-hydrogen mixture being passed continously through the contact mass, and the latter, which occupies a length of 1.5 meters and has a cross-sectional area of 7 to 8 square centimeters, and is situated in a nitrogen-hydrogen atmosphere, is exposed to the rays of an X-ray tube for 24 hours. The catalyst can then directly be employed for the synthesis of ammonia. It furnishes substantially larger yields and is less sensitive than a catalyst of similar composition which has not been irradiated. The said catalyst is distinguished by a greatly increased length of service. Thus even after it has been in continuous use for one year it still has a very high degree of activity, whereas a catalyst which has not been subjected to irradiation loses its activity for the most part after only 2 or 3 months of use under the said conditions.

It has already been proposed to subject catalysts during their employment in chemical reactions to irradiation with high frequency rays. The method of working according to the present invention is, however, far more advantageous than that hitherto known. In the first place the activity of the catalysts which are subjected to irradiation during the chemical reaction is only increased so long as the irradiation is continued. The increase in activity ceases as soon as the irradiation is stopped. A catalyst, which has been irradiated during its production according to the present invention, however, has a greatly increased activity in the chemical process in which it is employed, without any further irradiation during the process. The said increase in activity results in a very great increase in yield of the desired products. In practice considerable difficulties are encountered when subjecting a catalyst to irradiation during reactions carried out under pressure. The irradiation of the catalyst prior to the reaction is, however, a simple matter since it can be carried out under atmospheric pressure.

Owing to the fact that the length of service of the catalyst is so extensively increased, a very considerable economy of the process is effected. The substitution of fresh catalyst in the reaction vessel for a spent catalyst always takes a very considerable amount of time during which the production in the said reaction vessel must be stopped. There is also the danger that when cooling down the reaction vessel in order to put in fresh catalyst the inner catalyst containing tube is very liable to become cracked. According to the new process the said substitution of fresh catalyst is carried out far less often than hitherto.

What we claim is:

1. In catalytic reactions in which hydrogen is employed under pressure, the step of exposing the catalyst to be employed, prior to the reaction, to irradiation by rays of high frequency in the presence of a protective diluent, the catalyst during the said treatment being in the same physical and chemical state, insofar as its visible properties are concerned, in which it is subsequently to display its activity.

2. In catalytic reactions in which hydrogen is employed under pressure, the step of exposing the catalyst to be employed, prior to the reaction, to irradiation by rays of high frequency in the presence of a protective diluent, which takes part in the subsequent catalytic reaction, the catalyst during the said treatment being in the same physical and chemical state, insofar as its visible properties are concerned, in which it is subsequently to display its activity.

3. In catalytic reactions in which hydrogen is employed under pressure, the step of exposing the catalyst to be employed, prior to the reaction, to irradiation by X-rays in the presence of a protective diluent, the catalyst during the said treatment being in the same physical and chemical state, insofar as its visible properties are concerned, in which it is subsequently to display its activity.

4. In catalytic reactions in which hydrogen is employed under pressure, the step of exposing the catalyst to be employed, prior to the reaction, to irradiation by X-rays in the presence of a gas, which takes part in the subsequent catalytic reaction, the catalyst during the said treatment being in the same physical and chemical state, insofar as its visible properties are concerned, in which it is subsequently to display its activity.

5. In the synthesis of ammonia from its elements, the step of exposing the catalyst to be employed, prior to the reaction, to irradiation by X-rays in the presence of a protective diluent, the catalyst during the said treatment being in the same physical and chemical state, insofar as its visible properties are concerned, in which it is subsequently to display its activity.

6. In the synthesis of ammonia from its elements, the step of exposing the catalyst to be employed, prior to the reaction, to irradiation by X-rays in the presence of a gas which takes part in the subsequent catalytic reaction, the catalyst during the said treatment being in the same physical and chemical state, insofar as its visible properties are concerned, in which it is subsequently to display its activity.

7. In the synthesis of ammonia from its elements, the step of exposing the iron catalyst to be employed, prior to the reaction, to irradiation by X-rays in the presence of a nitrogen-hydrogen mixture, and thereupon employing the catalyst directly for the reaction.

8. In catalytic reactions in which hydrogen is employed under pressure, the step of exposing the catalyst to be employed, prior to the reaction and during the production of the catalyst, to irradiation by rays of high frequency in the presence of a protective diluent, the catalyst during the said treatment being in the same physical and chemical state, insofar as its visible properties are concerned, in which it is subsequently to display its activity.

9. In catalytic reactions in which hydrogen is employed under pressure, the step of exposing the catalyst to be employed, prior to the reaction and during the production of the catalyst, to irradiation by X-rays in the presence of a protective diluent, the catalyst during the said treatment being in the same physical and chemical state, insofar as its visible properties are concerned, in which it is subsequently to display its activity.

In testimony whereof we have hereunto set our hands.

JOHANNES FAHRENHORST.
KARL GOEGGEL.
FRANZ KRAEGELOH.